Patented Nov. 10, 1953

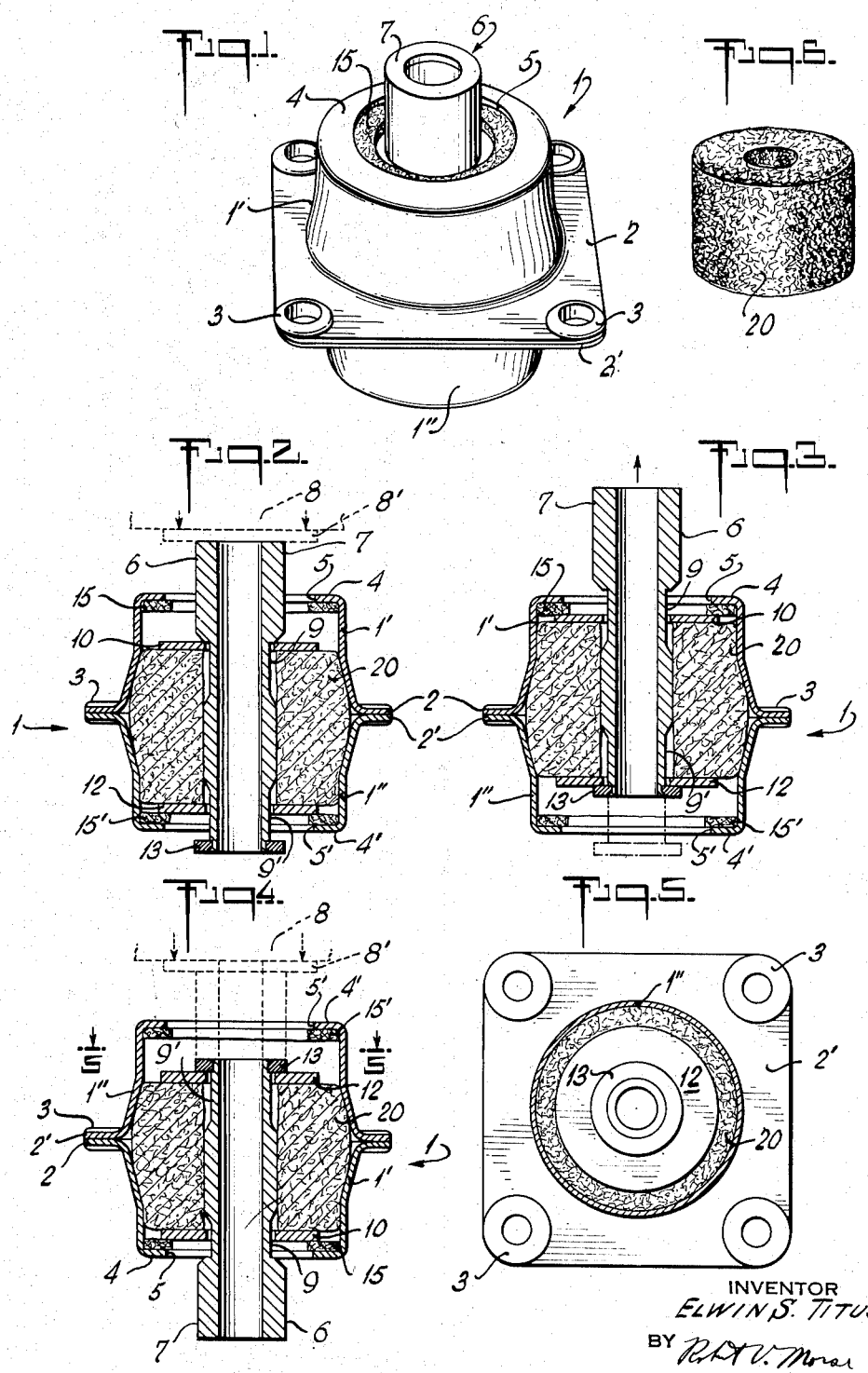

2,658,710

UNITED STATES PATENT OFFICE 2,658,710

VIBRATION ISOLATION UNIT

Elwin S. Titus, Ridgewood, N. J., assignor to Robinson Aviation, Inc., Teterboro, N. J., a corporation of New York Application May 4, 1950, Serial No. 159,993

3 Claims. (Cl. 248—358)

This invention relates to mechanical vibration absorption units of self-contained construction, which serve as mounts or supports to prevent harmful vibrations or shocks from reaching the articles to be protected. While specific shocks or vibrations can be neutralized along known engineering lines when space is available, the limitations of space necessarily present in relatively small self-contained unit mounts make it difficult to obtain a sufficient degree of absorption of both low and high frequency vibrations together with ability to cushion occasional shocks of much greater force.

One object of the present invention is to improve the performance of such mounts by increasing hysteresis without losing sensitivity to fine vibrations, so as to be strong enough to take shock yet responsive enough to continuously absorb vibrations that are hardly visible. Another object is to provide a unit of more general application which without much modification can be loaded from the top or bottom or sideways. Further objects are to diminish resonance and increase stability; to prevent drift or permanent set, so as to extend the life of the unit; to improve the tolerance for underload or overload to make the units more adaptable; to improve the durability and prevent deterioration in the presence of oil or water or heat or cold; and to simplify manufacture and installation.

Referring now to the drawings forming part of this specification, Fig. 1 is a perspective view of the device.

Fig. 2 is a cross-section thru the axis of the load carrying stud showing the cushion compressed under a downward load.

Fig. 3 is similar to Fig. 2 but in a rebound position giving an upward load.

Fig. 4 is an inverted installation showing a hanging load.

Fig. 5 is a plan section on the line 5—5 of Fig. 4 looking downward on the upper washer supporting the load.

Fig. 6 shows in perspective the main supporting mass of springs removed from the casing.

Similar reference numerals refer to similar parts thruout the various views.

The device as shown in the first five views consists of a barrel shaped casing 1 preferably made of two similar parts 1' and 1" having base flanges 2 and 2' secured together by any suitable means such as rivets, screws, bolts or welding, eyelet rivets 3 being shown by way of example. Each casing part 1' and 1" has inclined or tapered walls so that when they are joined together as shown the combined casing 1 bulges in the middle while being of somewhat reduced diameter at the two ends. These tapered walls have a combined releasing and snubbing function which will be described later. Each casing part 1' and 1" terminates in an end wall 4 and 4' having an opening 5 and 5' considerably larger than the mounting stud 6 which extends thru them.

This mounting stud 6 has a head 7 on which may be screwed or otherwise affixed the load 8. When the load is not sufficiently close to the case to itself limit the motion, a limiter flange or washer 8' may be used on the stud. Considering now the structure of the stud 6 normally within the casing, beyond the head 7 the stud is reduced in size as shown at 9 and carries a washer 10 of smaller internal diameter than the head 7 but capable of sliding relatively to the reduced portion 9 of the stud. Near the other extremity of the stud 6 is a similar washer 12 held on by the stud limit head 13. The washer 12 is also capable of sliding motion relative to the reduced portion 9' of the stud. Inside each end of the casing 1 are buffer rings 15 and 15' of resilient material lying under and projecting inward from the end walls 4 and 4' toward the washers and also toward the stud 6 so as to provide a limiting cushion between the sides of the stud 6 and the edges of the openings 5 and 5' thus preventing the stud from striking the hard edge of the casing parts 1' and 1". The sliding washers 10 and 12 have external diameters greater than the internal diameters of the buffer rings 15 and 15' so that the latter also serve to hold the washers 10 and 12 on the stud within the casing 1. Fig. 2 for example shows the washer 12 resting on the bottom buffer ring 15', and a similar restraining action would occur between the washer 10 and the upper buffer ring 15 in the event of an upward load or rebound as shown in Fig. 3.

The unit mounts are usually placed under the object to be supported, but their construction is such that they may also be used with the load suspended beneath them as shown for example in Fig. 4. Hanging loads are sometimes desirable in such applications as instrument panels for example, where the supported object is more in a vertical than a horizontal position and might tend to tip over. The device can also carry a lateral load and so can be mounted with the stud 6 horizontal or at any angle, since it is embedded in a cushion 20 of resilient material which acts in all directions as a support between the stud 6 and the casing 1.

The main vibration and shock absorbing cushion 20 is located inside the casing 1 and between the washers 10 and 12 forcing them apart. This cushion 20 is shown separately in Fig. 6 as removed from the casing and consists of a body of fine, intermingled springy metallic wires formed into a coherent unit by a powerful press or otherwise contained so that it may thereafter be handled as a unit of a certain general shape and thus be capable of being inserted or removed from the case 1. The wires are very small in diameter, about the order of a hair or bristle, and the pressure of the forming process on the mass crimps many of them at innumerable points beyond their elastic limit so that they take a more or less permanent set that tends to bind them together as a coherent whole. Such a unit may be defined as a mass of compacted metallic wires extending in various directions and contacting each other at innumerable points of support so that the short strands of wire between such points act as vibration absorption springs while the points of contact between the wires act as frictional snubbers to produce in the aggregate a metallic vibration absorption material whose modulus of elasticity changes markedly under increasing amplitude so as to resist resonance and shock. It is characterized by a high hysteresis due to the interwire friction, while at the same time having a delicate sensitivity due to the springiness of very fine wires. While the wires are of such a multifarious character that they cannot individually be subjected to engineering analysis, they can be studied in the mass, where their load-deflection curve is characterized by a pronounced curvature, much more of a curvature than is found with ordinary metal coil springs, or with rubber. The precompressed mass of wires is preferably enclosed in a light sleeve or cover of woven or knitted metal fabric to help hold it together. Any springy wire material of that general order of size may be used, but it is preferable that non-corrosive materials such as stainless steel, nickel alloys, or beryllium copper be employed where permanence under adverse conditions is desired. Such material is available on the market, being made in quantity principally for scrubbing or filtering of liquids, and it has special advantages in a vibration absorption combination due to its peculiar load-deflection characteristics.

In order to accentuate these characteristics so as to even more greatly bend the load-deflection curve, the casing 1 in which the wire mass is mounted has a greater internal diameter in the middle and tapers to a lesser internal diameter at each end. In the assembled unit the wire mass 20 fits snugly in both ends of the casing 1 but when lightly loaded has lateral clearance and freedom from any lateral constriction thruout practically its whole length, especially at the middle. This gives an easy unrestrained action with relatively large deflections for small loads and takes full advantage of the delicate sensitivity and absorbing powers of the innumerable little springs. But when the load is increased or shock occurs, the wire mass is no longer free to bulge but becomes more and more squeezed together in the narrowing taper of the end of the case, with great internal friction and very little yielding. The modulus of elasticity of the mass changes continually so as to prevent an abrupt shock at the end of the travel. The tapering form of the case in combination with this wire mass spring material gives a more desirable load-deflection curve, absorbs shock as well as light vibrations, and extends the underload and overload capacity. This is particularly important in standardized unit mounts since it extends the coverage of each size and reduces the number of types that have to be stocked. The rapidly changing modulus of elasticity with different deflections also tends to discourage amplification of resonance.

While I have in the foregoing described a certain specific form by way of example, it will be understood that it is merely for the purpose of illustration to make clear the principles of the invention, which is not limited to the particular form shown, but is susceptible to various modifications and adaptations in different installations as will be apparent to those skilled in the art without departing from the scope of the invention as stated in the following claims.

I claim:

1. In a vibration and shock absorption mount, the combination of a load carrying stud, a pair of washers slidably mounted on said stud, said stud having stops limiting the outward movement of said washers but allowing inward relative movement of the washers toward each other, a compacted mass of springy wires between said pair of washers forcing them apart, said wires being intermingled and crimped at various points beyond their elastic limit so as to bind the wires together, the wires extending in various directions and contacting each other at innumerable points of support so that the short strands of wire between said points of support act as vibration absorption springs and the points of contact between the wires act as frictional snubbers, a casing surrounding said stud, washers and mass of springy wires, the inner diameter of said casing being considerably larger than the outer diameter of the washers to allow clearance for lateral movement, said casing having end walls with holes around the stud at both ends of said casing, said holes being larger than the stud to permit lateral movement of the stud against the mass of wires as well as axial movement relative to either washer, said washers being of greater diameter than said holes, resilient buffer rings between the inside of said end walls and the outer faces of said washers, said buffer rings having a greater outer diameter than said holes and a smaller inner diameter than the outer diameter of the washers so as to limit the outward movement of the washers, said buffer rings having a smaller internal diameter than the holes in the ends of the casing so as to extend inward beyond the edges of said holes and cushion the impact of the stud under excessive lateral vibration before it can strike the casing, whereby the load carrying stud can carry loads from all directions axially and radially.

2. In a vibration and shock absorption mount, the combination of a load carrying stud, a pair of washers slidably mounted on said stud, said stud having stops limiting the outward movement of said washers but allowing inward relative movement of the washers toward each other, a compacted mass of springy wires between said pair of washers forcing them apart, said wires being intermingled and crimped at various points beyond their elastic limit so as to bind the wires together, the wires extending in various directions and contacting each other at innumerable points of support so that the short strands of wire between said points of support act as vibration absorption springs and the points of contact between the wires act as frictional snubbers, a casing surrounding said stud, washers and mass of springy wires, said casing having a greater internal diameter at the middle than at the ends so as to taper inward both ways from the middle and provide clearance for the compacted mass of wires at the middle when they are lightly loaded and increased resistance by wedging of the mass into the tapered casing when under heavier load, said casing having end walls with holes around the stud at both ends of said casing, said holes being larger than the stud to permit lateral movement of the stud against the mass of wires as well as axial movement relative to either washer, said washers being of greater diameter than said holes, resilient buffer rings between the inside of said end walls and the outer faces of said washers, said buffer rings having a greater outer diameter than said holes and a smaller inner diameter than the outer diameter of the washers so as to limit the outward movement of the washers, said buffer rings having a smaller internal diameter than the holes in the ends of the casing so as to extend inward beyond the edges of said holes and cushion the impact of the stud under excessive lateral vibration before it can strike the casing, whereby the load carrying stud can carry loads from all directions axially and radially.

3. In a vibration and shock absorption mount, the combination of a load carrying stud, a pair of washers slidably mounted on said stud, said stud having stops limiting the outward movement of said washers but allowing inward relative movement of the washers toward each other, a compacted mass of springy wires between said pair of washers forcing them apart, said wires being intermingled and crimped at various points beyond their elastic limit so as to bind the wires together, the wires extending in various directions and contacting each other at innumerable points of support so that the short strands of wire between said points of support act as vibration absorption springs and the points of contact between the wires act as frictional snubbers, a casing surrounding said stud, washers, and mass of springy wires, the inner diameter of said casing being considerably larger than the outer diameter of the washers to allow clearance for lateral movement, said casing having end walls with holes around the stud at both ends of said casing, said holes being larger than the stud to permit lateral movement of the stud against the mass of wires as well as axial movement relative to either washer, said washers being of greater diameter than said holes, resilient buffer rings of compacted springy wires intermingled and crimped to bind them together, said buffer rings being located between the inside of said end walls and the outer faces of said washers, said buffer rings having a greater outer diameter than said holes and a smaller inner diameter than the outer diameter of the washers so as to limit the outward movement of the washers, said buffer rings having a smaller internal diameter than the holes in the ends of the casing so as to extend inward beyond the edges of said holes and cushion the impact of the stud under excessive lateral vibration before it can strike the casing, whereby the load carrying stud can carry loads from all directions axially and radially.

ELWIN S. TITUS.

References Cited in the file of this patent
UNITED STATES PATENTS

| Number | Name | Date |
| --- | --- | --- |
| 1,920,436 | Riker | Aug. 1, 1933 |
| 2,032,659 | Hussman | Mar. 3, 1936 |
| 2,359,915 | Hussman | Oct. 10, 1944 |
| 2,389,562 | Storch | Nov. 20, 1945 |
| 2,520,442 | Schwartz | Aug. 29, 1950 |